United States Patent [19]

Ronn et al.

[11] Patent Number: 4,778,500

[45] Date of Patent: Oct. 18, 1988

[54] LASER INITIATED CHAIN REACTIONS FOR PRODUCING A SINTERED PRODUCT

[75] Inventors: Avigdor M. Ronn, Great Neck; Jaime Nieman, Rego Park, both of N.Y.

[73] Assignee: Research Foundation of the City University of New York, New York, N.Y.

[21] Appl. No.: 84,049

[22] Filed: Aug. 11, 1987

[51] Int. Cl.$^4$ .................. C03B 37/08; B01J 19/12
[52] U.S. Cl. .................................. 65/3.12; 65/17; 204/157.22; 204/157.61; 423/337; 423/344
[58] Field of Search .................. 65/3.12, 17; 204/157.22, 157.51, 157.61; 423/337, 344

[56] References Cited

U.S. PATENT DOCUMENTS

| | | | |
|---|---|---|---|
| 4,108,964 | 8/1978 | Kratel et al. | 423/337 X |
| 4,294,601 | 10/1981 | Dabby et al. | 65/3.12 |
| 4,343,687 | 8/1982 | Ronn | 204/157.41 |
| 4,347,069 | 8/1982 | Haney et al. | 65/3.12 |
| 4,548,798 | 10/1985 | Rice | 423/335 X |
| 4,558,017 | 12/1985 | Gupta et al. | 204/157.22 X |

*Primary Examiner*—Robert L. Lindsay
*Attorney, Agent, or Firm*—Blum Kaplan

[57] ABSTRACT

A laser initiated process generates a shock wave of sufficient strength to produce a sintered product. The sintered product is prepared from at least a fuel and an oxidizer that will sustain an explosion in a reaction vessel. The explosion is initiated by introducing a laser beam into the reaction vessel and a shock wave begins to propagate at the point where the explosion is initiated. A sintered product is prepared when the shock wave is sufficiently strong to densify the product. Although the reaction will proceed using a two-component fuel-oxidizer mixture, the reaction is especially useful for producing sintered doped or undoped silicon dioxide ($SiO_2$) from a reaction mixture containing at least silicon tetrachloride, hydrogen and oxygen. The sintered $SiO_2$ can be deposited on a deposition surface situated in the reaction vessel to produce a preform that can be processed to produce an optical fiber.

28 Claims, No Drawings

LASER INITIATED CHAIN REACTIONS FOR PRODUCING A SINTERED PRODUCT

BACKGROUND OF THE INVENTION

This invention relates to laser initiated explosive reactions for producing sintered products and, in particular, to a laser initiated reaction that produces sintered silicon dioxide ($SiO_2$) which can be used to manufacture preforms for production of optical fibers, fiber optic waveguides and insulators for integrated circuits.

Optical waveguides having a core of a first material with a first index of refraction, $n_1$, and a cladding of a second material with an index of refraction different than the first index of refraction, $n_2$, are well known and effective transmitting media when $n_1$, $n_2$ and the diameter of the core are properly coordinated to limit transmitted light to preselected modes. In general, the index of refraction of the core will be higher than the index of refraction of the cladding. A discussion of the physical requirements of satisfactory transmitting media can be found in U.S. Pat. No. 3,659,915 issued to Maurer et al on May 2, 1972 and in references cited therein.

Optical waveguides having cores of fused silica doped with a multivalent metal oxide to increase the index of refraction are especially useful. The cladding can then be an undoped high purity fused silica which has a lower index of refraction.

Optical waveguides of this type are manufactured, for example, by the method disclosed in U.S. Pat. No. 3,933,454 issued to DeLuca on Jan. 20, 1976. As disclosed therein, at least one coating of glass ($SiO_2$) soot or powder is deposited by a flame hydrolysis process on a starting member or seed rod. The soot coating is heated to a consolidation temperature in an atmosphere containing helium and chlorine in order to form a dense glass layer from which water has been substantially removed. After consolidation, the starting member can be removed and the resulting structure is drawn into a waveguide fiber. The DeLuca process is commonly used in the manufacture of optical waveguide fibers.

U.S. Pat. No. 4,343,687 issued on Aug. 10, 1982 to Ronn, one of the named inventors herein, discloses a method for initiating chain reactions using laser energy. At least two gaseous compounds capable of sustaining a chain reaction are introduced into a bounded space. A laser beam of sufficient fluence to initiate a chain reaction is irradiated into the space and a powder material is produced. The process can be used to deposit a powdered product onto a support such as alumina pellets, glass slides or silicon wafers.

Other laser syntheses of powder material are also known. These include, for example, synthesis of refractory oxide powders by the method disclosed in U.S. Pat. No. 4,548,798 issued to Rice on Oct. 22, 1985 wherein refractory oxide powders are obtained by pyrolyzing a metal and oxygen-containing organic chemical species that is capable of absorbing laser energy in a vibrational mode. In addition, U.S. Pat. No. 4,558,017 issued to Gupta et al on Dec. 10, 1985 relates to production of ultrafine powders such as metal silicide powder and silicon. Gaseous reactants including a metal halide and a silicon-containing compound are exposed to high intensity light, such as laser light, to yield the ultrafine powder by a photolytic reaction.

One disadvantage of producing a powder material for use in forming a glass material such as an optical waveguide fiber is that the powder material must be consolidated or sintered to form the dense glass material. Consolidation or sintering processes are generally performed using an oxy-hydrogen flame burner or other relatively expensive and impure heating method. As a result, impurities may be introduced into the final glass product, often rendering the product unsatisfactory for use as a waveguide.

It is, therefore, desirable to provide a process for producing a sintered product such as sintered silicon dioxide in a single reactive step that overcomes the disadvantages of prior art sintering processes.

SUMMARY OF THE INVENTION

Generally speaking, in accordance with the invention, a laser initiated process that generates a shock wave of sufficient strength to produce a sintered product is provided. The sintered product is prepared from at least a fuel and an oxidizer that will sustain an explosion in a reaction vessel. The explosion is initiated by introducing a laser beam into the reaction vessel and a shock wave begins to propagate at the point where the explosion is initiated. A sintered product is prepared when the shock wave is sufficiently strong to densify the product. Although the reaction will proceed using a two-component fuel-oxidizer mixture, the reaction is especially useful for producing sintered doped or undoped silicon dioxide ($SiO_2$) from a reaction mixture containing at least silicon tetrachloride, hydrogen and oxygen. The sintered $SiO_2$ can be deposited on a seed rod situated in the reaction vessel to produce a preform that can be processed to produce an optical fiber.

Accordingly, it is an object of the invention to provide an improved process for producing sintered products.

Another object of the invention is to provide a laser initiated process for producing sintered products.

A further object of the invention is to provide a laser initiated chain reaction that generates a shock wave of sufficient strength to produce sintered products.

Still another object of the invention is to provide an improved process for manufacturing optical fibers, preforms for optical fibers and optical fiber waveguides.

A still further object of the invention is to provide an efficient process for producing sintered products.

Yet another object of the invention is to provide a laser initiated process for producing sintered products that affords control of purity, particle size and characteristics.

Yet a further object of the invention is to provide a laser initiated process for producing sintered product that can be either resonant or non-resonant.

Another object of the invention is to provide an improved process for manufacturing optical fibers, preforms for optical fibers and optical fiber waveguides used in fields such as communications, medicine, computers and military applications.

A further object of the invention is to provide a method for depositing sintered $SiO_2$ on a seed rod in a single reactive step.

Still other objects and advantages of the invention will in part be obvious and will in part be apparent from the specification.

The invention accordingly comprises the several steps and the relation of one or more of such steps with respect to each of the others thereof, which will be exemplified in the process hereinafter disclosed, and the scope of the invention will be indicated in the claims.

DETAILED DESCRIPTION OF THE INVENTION

The laser induced or initiated chain reaction (LICR) of the invention relies on the non-stoichiometric use of laser photons to produce sintered products. The chain reaction is initiated by introduction of a laser pulse into a combustible mixture to detonate the mixture and generate a shock wave of sufficient strength to sinter the reaction product.

In general, detonation systems are extremely complex. Although no theoretical approach exists for accurately predicting the behavior of even the simplest detonation systems, the expected behavior can be qualitatively understood. In addition, experimentally observed parameters are well documented for many systems. An exemplary reference is *The Chemistry of Combustion Processes*, Thompson M. Sloan, Ed., American Chemical Society, Washington, D.C., chaps. 8-10 (1984).

Two important parameters affecting the strength of a shock wave generated in a given system when it is detonated are the change in temperature, $\Delta T$, and the change in pressure, $\Delta P$. The change or increase in temperature is dependent on the exothermicity of the particular chemical reaction and can be measured using a variety of techniques, particularly spectroscopic techniques. Typical values of $\Delta T$ range between about 20000° and 3000° K. or greater for common fuel-oxidizer mixtures. Typical values are shown, for example, in *Flames—Their Structure, Radiation and Temperature*, A. G. Gaydon and H. G. Wolfard, Chapman & Hall, London, p. 338 (1978). The temperature increase is relatively unaffected by the mixture's original total pressure so long as the relative concentrations of reactants remain unchanged.

The change or increase in pressure is generally stated in terms of a pressure overrise $\Delta P$ which is defined by the normalizing equation:

$$\Delta P = (P_f/P_i) - 1$$

wherein $P_i$ is the initial pressure and $P_f$ is the maximum pressure achieved during the detonation. Values of $\Delta P$ in common combustible pairs generally range between about 15 and 25. Exemplary values for pressure overrise are shown in *The Chemistry of Combustion Processes*, supra, at page 128 for an $H_2/O_2$ system and in *Encyclopedia of Explosives And Related Items*, PATR-2700, Seymour M. Kay, U.S. Army Armament Research and Development Command, Large Caliber Weapons Systems Laboratory, Dover, N.J., Volumes 4, 6, 8, 9 and 10 (1978).

In addition to the changes in temperature and pressure, the intensity of the shock wave generated by a particular detonation is heavily dependent on geometrical considerations including the shape of the reaction vessel and the point of points of initiation of the reaction. When an explosion is detonated, shock waves propagate radially outward from the point of initiation of the reaction and continue to travel along a straight line path with normal damping until a boundary is reached. The wave is absorbed or reflected at the boundary. For example, a cylindrical cell will support a propagating shock wave having characteristics different than those of a propagating shock wave within a spherical cell since the cell boundaries differ. Furthermore, if detonation is triggered at more than one point within a cell, the resultant shock waves will interfere either constructively or destructively to create a different standing shock wave pattern than would be observed when a reaction is generated using a single ignition source at one end of the same cell. Thus, in order to provide a sintered product in accordance with the invention, the shock wave must have sufficient strength within the bounds of the particular chemical reaction, the initial total and partial pressure, the cell geometry and the number and location of ignition points within the cell to densify the reaction product. A pure doped or undoped sintered product is provided by appropriate choice of these parameters.

To prepare sintered products in accordance with the invention, at least two reactants, one of which functions primarily as a fuel and the other which functions primarily as an oxidizer, are introduced into a reaction vessel at predetermined pressure sufficient to generate the detonation wave necessary to produce the sintered product. A laser beam from a laser source is directed to and enters the reaction vessel and generates a sufficient number of species to create a controlled explosion in the reaction vessel. The reaction vessel must be of sufficient strength to contain the explosion thereof. The branching chain begun by the laser is self-sustaining due to the exothermicity of the process and a sintered product is provided as a result of the heat and pressure rises in the vessel and the geometry of the reaction vessel.

Specifically, the fuel and oxidizer react in an explosive manner to drive the reaction. In many cases it is sufficient to use the two-component fuel-oxidizer mixture to obtain the desired material. Alternatively, one, two or more reactants can be used in combination with the fuel-oxidizer mixture. In such cases, the fuel, oxidizer and/or other reactants decompose to provide the desired sintered product. Each of the fuel and oxidizer must have a vapor pressure at a reasonable temperature. In a preferred embodiment, reasonable temperatures are greater than about $-100°$ C. and more preferably range between about 50° below room temperature ($-30°$ C.) to about 50° C. above room temperature (70° C.) and most preferably, are at room temperature (20° C.).

Other than the requirement that the reactants must have a vapor pressure, the choice of reactants is unlimited. In most cases, the method is non-resonant, that is, there is no coincidence between the molecular absorption characteristics of the reactants and the laser radiation. Therefore, the spectroscopic characteristic of the molecules is not relevant and the choice of reactants can be made based on economics, ease of handling and purity. Alternatively, the molecular absorption characteristics of the reactants and the laser radiation can be coincident, i.e. the process can be resonant, and this has no deleterious effect on production of a sintered product.

Gaseous explosive fuel-oxidizer-reactant mixtures are generally used, but it is also to be understood that the method is applicable to use of one or more liquids as the reactant. In general, any hydrocarbon can be used in the presence of oxygen and some hydrocarbons can be used in the presence of chlorine. The following combinations of reactants are exemplary, but the explosives with which the chain reactions of the invention are useful is not in any way limited to these reactants:

TABLE I

| Fuel | Oxidizer | Additional Reactant |
|------|----------|--------------------|
| $H_2$ | $CrO_2Cl_2$ | |
| $CH_4$ | $Cl_2$ | |

TABLE I-continued

| Fuel | Oxidizer | Additional Reactant |
|---|---|---|
| $H_2$ | $O_2$ | $SiCl_4$ |
| $H_2$ | $O_2$ | $SiCl_4$, HF |

The additional reactant or reactants can be any material that will decompose to form a sintered product. In general, any saturated or unsaturated hydrocarbon, alcohol or ether can be used as fuels and air, oxygen, chlorine and fluorine can be used as oxidizers but the fuels and oxidizers are not intended to be in any way limited to these examples. In addition, suitable reactants include, but are not limited to, silicon tetrachloride ($SiCl_4$), iron carbonyl ($Fe(CO)_5$), titanium tetrachloride ($TiCl_4$), vanadyl chloride ($VOCl_3$), osmium tetroxide ($OsO_4$), tetramethyl silane ($Si(CH_3)_4$) and the like.

The fuel, oxidizer and additional reactants, if any, are selected so as to produce an appropriate reaction. One or more components of the fuel or oxidizer can be used in excess as a reactant. A single reactant can be present in addition to the fuel-oxidizer pair. Alternatively, two or more reactants can be used and caused to react with each other using an appropriate fuel-oxidizer mixture to produce a desired material such as an alloy.

As is apparent, the sintered product is determined by the fuel-oxidizer mixture chosen as well as by the reactant or reactants and the relative amounts of each. An example is the decomposition of $VOCl_3$ in the presence of $H_2$ and $O_2$. When excess $O_2$ is used, the reaction product is $V_2O_5$. However, when $H_2$ is used in large excess, $V_2O_3$ is produced. As can be seen, any desired sintered product can be produced by judicious choice of materials and their concentration in the reaction mixture. The process is useful for production of any sintered oxide, ceramic, metal alloy or semiconductor material in pure, doped or mixed alloy form.

Some exemplary reaction components are shown in TABLE II. It is to be understood that TABLE II is presented for purposes of illustration only and is not intended to be construed in a limiting sense.

TABLE II

| Fuel | Oxidizer | Additional Reactant | Product | Comments |
|---|---|---|---|---|
| $H_2$ | $CrO_2Cl_2$ | | $Cr_2O_3$ | Oxidizer also serves as reactant. Resonant system |
| $CH_4$ | $Cl_2$ | | C | Fuel also serves as reactant |
| $H_2$ | $O_2$ | $SiCl_4$ | $SiO_2$ | Product is the result of reaction between the reactant and excess oxidizer |
| $H_2$ | $O_2$ | $SiCl_4$, HF | $SiO_2$, F | Product is the result of reaction between the reactant and excess oxidizer but it is also doped with F as a result of HF (second reactant) dissociation |
| $Si(CH_3)_4$ | $Cl_2$ | | SiC | Fuel also serves as reactant |

The purity of the sintered products is extremely high and is limited primarily by the purity of the components in the laser excited reaction mixture. The sintered material consists of fused submicron particles having a fairly uniform size distribution as determined by scanning electron microscopy.

Additionally, a dopant can be provided in the reaction mixture for providing a doped sintered product. Suitable dopants include, but are not limited to, chlorine, fluorine, bromine, $PH_3$, $B_2H_6$ and the like. For example, fluorine doping can be performed by including fluorine-containing vapors such as HF, $F_2$, or $SiF_4$ in the reaction mixture in predetermined amounts so that the amount of dopant in the sintered product is accurately controlled. The exothermicity of the chain reaction provides the energy necessary to decompose the fluorine-containing reagent.

The reaction vessel must be strong enough to contain explosive reaction and have a window suitable for transmitting the laser radiation. Suitable windows for transmitting $CO_2$ laser radiation include, but are not limited to, NaCl, ZnSe or Ge-containing materials.

Any laser of sufficient energy to initiate the reaction can be used. In a preferred embodiment, a TEA $CO_2$ laser capable of an energy output between about 2.5 and 3.0 Joules (J), a pulse duration of 200 nanoseconds (nsec) and a full width half maximum and a tail of about 1 microsecond ($\mu$sec) is used. Other laser systems useful in the process of the invention include, but are not limited to, Excimer, neodymium:Yag, neodymium:glass at about 1.06 microns ($\mu$) and solid state lasers such as Gallium Aluminum Arsenide (GaAlAs) at 0.78 micrometers ($\mu$m).

The laser radiation can be focused into reaction vessels of any suitable shape and size for containing the reaction. A lens may be used to increase the fluence of the laser to a level sufficient for the reaction to be initiated. No lens is required with lasers of sufficient fluence. The focal distance of the lens is determined by the desired fluence.

The laser radiation is introduced into the reaction vessel containing the fuel, oxidizer and any additional reactants through the window in the vessel. The reaction proceeds throughout the vessel and fuel, oxidizer and the reactants are decomposed to form the desired sintered product. The reaction is generally nonresonant as determined by the fact that the reaction proceeds even when none of the components of the reactive mixture have an absorption feature coincident with the laser but can, alternatively, be resonant with one or more of the components in the mixture.

The process for preparing sintered products in accordance with the invention has broad application for preparation of oxides, ceramics, metals, semiconductors and superconductors. One particular application for which the process has been found to be suitable is the deposition of silicon dioxide on a seed rod, especially a quartz seed rod, situated in the reaction vessel at the time the explosive reaction occurs for use in manufacturing preforms for optical waveguides and optical fibers. The sintered silicon dioxide is deposited directly on the seed rod in a single reactive step without the separate steps of depositing a silicon dioxide soot and sintering the glass soot to obtain a preform. Thus, the impurity-introducing and time-consuming step of sintering the soot material using an oxy-hydrogen flame burner or other impure heating source in the presence of chlorine is eliminated and the sintered silicon dioxide is deposited in a pure form. Alternatively, the sintered silicon dioxide can be doped using a controlled amount of a dopant to provide a preform for graded index fibers.

This invention will be better understood with reference to the following examples. These examples are presented for purposes of illustration only and are not intended to be construed in a limiting sense.

EXAMPLE 1

A cylindrical aluminum reaction vessel with a ZnSe window having dimensions of ¾ inch diameter and ½ inch thickness was used and 100 torr $SiCl_4$, 500 torr $H_2$ and 667 torr $O_2$ (total pressure of 1.67 atm) were introduced into the vessel. A single pulse of a TEA $CO_2$ laser having an energy output of 2.5 to 3.0 J, a pulse duration of 200 nsec and a full width half maximum and a tail of about 1 μsec was focused using a 5 inch lens and introduced into the reaction vessel through the window. Very large explosions were observed through a quartz side window. The material deposited was gritty to the touch and felt like shattered glass. The material was analyzed using scanning electron microscopy (SEM) and it was determined that the $SiO_2$ material consisted of fused or sintered submicron particles. The instantaneous pressure wave and temperature jumps that occurred upon initiation of the reaction generated a sufficient shock wave to cause sintered or densified $SiO_2$ to be produced.

EXAMPLE 2

One hundred torr $SiCl_4$, 600 torr $H_2$ and 629 torr $O_2$ (total pressure of 1.75 atm) were introduced into an aluminum reaction vessel of the type described in Example 1. The reaction proceeded as described in Example 1 and similar results were observed.

EXAMPLE 3

Several experiments were conducted using mixtures similar to those of Examples 1 and 2 in the presence of a small quartz seed rod. The $SiO_2$ was deposited on the seed rod and appeared nearly transparent. The deposited $SiO_2$ could not be removed by scratching with a metal tool, washing with water, acetone or methanol or with adhesive tape and was strongly bonded to the quartz rod. SEM analysis of portions of the rod confirmed that the deposited $SiO_2$ was almost completely fused to the seed rod.

The laser initiated chain reactions conducted in accordance with the invention are effective synthetic routes for the production of oxides, ceramics, metals or semiconductor materials in pure, doped or mixed alloy forms. In particular, the technique is especially useful for production of sintered silicon dioxide and can be used to manufacture graded index fibers since doping can be accomplished as the sintered product is formed. The process is flexible and can easily be scaled to a manufacturing level. The simultaneous formation and sintering obviates the need for the energy intensive and relatively "dirty" sintering step used in current processes for manufacturing sintered products, particularly silicon dioxide, since bonded films are deposited on substrates in a single reactive step without any additional treatment. In particular, laser initiated high pressure chain reactions are especially useful for production of silicon dioxide in the manufacture of optical fibers and the deposition of thin films. The process produces an extremely pure, doped or undoped, sintered product.

It will thus be seen that the objects set forth above, among those made apparent from the preceding description, are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A process for producing sintered products comprising the steps of introducing a mixture of at least one fuel and at least one oxidizer into a reaction vessel at predetermined pressures such that the fuel and oxidizer are capable of sustaining a chain reaction and providing a sintered product, providing a deposition surface within the reaction vessel, and initiating a chain reaction at at least one initiation point in the reaction vessel by irradiating the mixture with at least one laser pulse of sufficient fluence to create a shock wave having sufficient energy to provide a densified product on the deposition surface.

2. The process of claim 1, wherein the reaction is initiated using a single pulse of a laser selected from Excimer, neodymium:Yag, neodymium:glass, Gallium-Aluminum-Arsenide and $CO_2$.

3. The process of claim 1, wherein the fuel and oxidizer have a vapor pressure at temperatures greater than about $-100°$ C.

4. The process of claim 3, wherein the fuel and oxidizer are gaseous.

5. The process of claim 1, wherein the mixture further includes at least one reactant.

6. The process of claim 5, wherein the mixture includes at least hydrogen and oxygen.

7. The process of claim 5, wherein the reactant is silicon tetrachloride.

8. The process of claim 2, wherein the laser is a $CO_2$ laser.

9. The process of claim 1, wherein the deposition surface is a seed rod.

10. The process of claim 5, wherein the at least one reactant is a liquid.

11. The process of claim 1, wherein the at least one initiation point is more than one initiation point.

12. The process of claim 11, wherein the chain reaction is initiated at more than one initiation point using more than one laser pulse.

13. The process of claim 11, wherein the chain reaction is initiated at more than one initiation point using a single divided laser pulse.

14. The process of claim 1, wherein the sintered product is doped by including a suitable amount of a dopant-containing compound in the mixture.

15. The process of claim 1, wherein the process is used to form a preform for an optical waveguide.

16. A process for producing sintered silicon dioxide comprising the steps of introducing a mixture of silicon tetrachloride, hydrogen and oxygen into a cylindrical reaction vessel at a total pressure of over about 1 atmosphere and initiating a reaction in the reaction vessel by irradiating the mixture with a single pulse from a $CO_2$ laser.

17. The process of claim 16, wherein the sintered silicon dioxide is deposited on a seed rod contained within the reaction vessel to form a preform for an optical waveguide.

18. The process of claim 17, wherein the seed rod is quartz.

19. The process of claim 18, wherein the seed rod is doped quartz.

20. The process of claim 16, wherein the sintered silicon dioxide is doped by introducing a gaseous dopant into the reaction vessel prior to initiating the reaction.

21. The process of claim 18, wherein the sintered silicon dioxide is doped by introducing a gaseous dopant into the reaction vessel prior to intiating the reaction.

22. The process of claim 21, wherein the process is used to form a graded index fiber.

23. The method of claim 17, further including introducing a suitable amount of a dopant-containing reactant into the reaction vessel prior to irradiating the laser beam so as to form doped sintered silicon dioxide on the seed rod after the reaction is initiated.

24. The process of claim 16, wherein a tube is provided in the reaction vessel and the sintered silicon dioxide is deposited on the inner surface of the tube.

25. The process of claim 24, wherein the tube is quartz.

26. The process of claim 24, wherein the tube is doped quartz.

27. A method for producing preforms for optical waveguides comprising:
   providing a reaction vessel having a deposition surface therein;
   introducing silicon tetrachloride, hydrogen and oxygen into the reaction vessel at a total pressure of over about 1 atmosphere; and
   irradiating a laser beam into the reaction vessel at a fluence sufficient to initiate a chain reaction in the vessel and deposit sintered silicon dioxide on the deposition surface to form a preform for an optical fiber or waveguide.

28. The method of claim 27, further including introducing a suitable amount of dopant-containing reactant into the reaction vessel prior to irradiating the laser beam so as to form doped sintered silicon dioxide on the deposition surface after the reaction is initiated.

* * * * *